US011703241B2

(12) United States Patent
Costa et al.

(10) Patent No.: US 11,703,241 B2
(45) Date of Patent: Jul. 18, 2023

(54) ENVIRONMENTAL CONTROL UNIT INCLUDING MAINTENANCE PREDICTION

(71) Applicants: Robert Bosch LLC, Broadview, IL (US); Robert Bosch GmbH, Stuttgart (DE)

(72) Inventors: Goncalo Costa, Cambridge, MA (US); Jerry Huson, Watham, MA (US); Klaus Herz, Wernau (DE)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 127 days.

(21) Appl. No.: 17/337,845

(22) Filed: Jun. 3, 2021

(65) Prior Publication Data

US 2021/0293433 A1    Sep. 23, 2021

Related U.S. Application Data

(62) Division of application No. 16/017,644, filed on Jun. 25, 2018, now Pat. No. 11,054,164.
(Continued)

(51) Int. Cl.
*F24F 11/38* (2018.01)
*G05B 13/02* (2006.01)
(Continued)

(52) U.S. Cl.
CPC ............. *F24F 11/38* (2018.01); *F25B 49/005* (2013.01); *F25B 49/02* (2013.01); *G05B 13/024* (2013.01);
(Continued)

(58) Field of Classification Search
CPC ......... F24F 11/38; F25B 49/005; F25B 49/02; F25B 13/00; F25B 2500/13;
(Continued)

(56) References Cited

U.S. PATENT DOCUMENTS 6,332,362 B1 * 12/2001 Lee .................. G01H 1/003
73/659
6,342,005 B1    1/2002 Daniels et al.
(Continued)

FOREIGN PATENT DOCUMENTS

CN          102713780 A * 10/2012 ......... G05D 23/1919

*Primary Examiner* — Tung S Lau
(74) *Attorney, Agent, or Firm* — Kelly McGlashen; Maginot, Moore & Beck LLP

(57) ABSTRACT

A monitoring and/or control device for an environmental control unit such as a heat pump determines the performance status and whether maintenance is required of a component of the unit for example a compressor during operation of the component. The device includes sensors configured to be situated relative to the compressor so as to receive and signal data from the compressor during operation of the component. In some embodiments, the device includes a vibration detector and a controller coupled to the vibration detector. The controller is configured to (i) receive electrical signals from the vibration detector, (ii) compare the electrical signals to a reference signal, (iii) determine the performance characteristic of the component based on the results of the comparison, and (iv) output a signal corresponding to the performance characteristic of the component to a user display. The controller may also request maintenance and/or order parts automatically.

8 Claims, 6 Drawing Sheets

Related U.S. Application Data

(60) Provisional application No. 62/527,468, filed on Jun. 30, 2017.

(51) Int. Cl.
  G05B 23/02 (2006.01)
  F25B 49/00 (2006.01)
  F25B 49/02 (2006.01)
  F25B 13/00 (2006.01)

(52) U.S. Cl.
  CPC .......... G05B 23/0283 (2013.01); *F25B 13/00* (2013.01); *F25B 2500/13* (2013.01); *F25B 2500/19* (2013.01); *F25B 2600/0251* (2013.01); *F25B 2700/151* (2013.01); *F25B 2700/2104* (2013.01); *F25B 2700/2106* (2013.01); *F25B 2700/21152* (2013.01); *G05B 2219/2614* (2013.01)

(58) Field of Classification Search
  CPC .......... F25B 2500/19; F25B 2600/0251; F25B 2700/151; F25B 2700/2104; F25B 2700/2106; F25B 2700/21152; G05B 13/024; G05B 23/0283; G05B 2219/2614
  See application file for complete search history.

(56) References Cited

U.S. PATENT DOCUMENTS

| | | | |
|---|---|---|---|
| 7,761,216 B2 | 7/2010 | Norris et al. | |
| 7,785,098 B1* | 8/2010 | Appleby | G21K 1/02 264/319 |
| 2005/0160732 A1* | 7/2005 | Herz | F02D 41/0007 60/605.1 |
| 2008/0083233 A1* | 4/2008 | Song | F25B 49/005 62/127 |
| 2009/0049895 A1* | 2/2009 | Huber | G01M 15/11 73/114.02 |
| 2010/0282076 A1* | 11/2010 | Fox | B01D 46/0086 95/25 |
| 2011/0189440 A1* | 8/2011 | Appleby | B22C 9/10 523/435 |
| 2014/0039687 A1* | 2/2014 | Mercer | F25B 49/005 165/200 |
| 2014/0159635 A1* | 6/2014 | Powell | G01M 13/00 73/488 |
| 2016/0282026 A1* | 9/2016 | Park | F24F 11/86 |
| 2016/0334127 A1* | 11/2016 | Rupp | F24F 11/30 |
| 2019/0123931 A1* | 4/2019 | Schuster | G05B 13/0265 |
| 2019/0226709 A1* | 7/2019 | Davis, II | F24F 11/49 |
| 2020/0191458 A1* | 6/2020 | Read | F24F 11/41 |
| 2021/0293433 A1* | 9/2021 | Costa | F25B 49/02 |

* cited by examiner

ENVIRONMENTAL CONTROL UNIT INCLUDING MAINTENANCE PREDICTION

CROSS REFERENCE TO RELATED APPLICATIONS

This application is a divisional of U.S. patent application Ser. No. 16/017,644 filed Jun. 25, 2018, which claims priority to U.S. Provisional Patent Application No. 62/527,468, filed Jun. 30, 2017. Each of these applications is incorporated by reference herein in its entirety.

BACKGROUND

The present disclosure relates to devices and methods for maintenance prediction in residential or commercial heating, ventilation and/or air conditioning (HVAC) or heat pump units.

Environmental control units such as HVAC or heat pump units are used in many heating and cooling applications to control the environment within a closed space. Some conventional heat pumps, for example, include a condensing heat exchanger and an evaporating heat exchanger disposed in a cabinet along with a compressor and a fan that is configured to draw air through the heat exchangers. Even when recommended routine maintenance is performed, it can be difficult to identify problems and or anticipate upcoming maintenance issues with the mechanical components before they become serious and/or lead to failure of the unit. It is desirable to be able to predict maintenance needs of the components before costly and/or irreparable damage occurs.

SUMMARY

In one aspect, a monitoring and/or control device for an environmental control unit such as a heat pump determines the performance status and whether maintenance is required of a component of the unit for example a compressor during operation of the component. The device includes sensors configured to be situated relative to the compressor so as to receive and signal data from the compressor during operation of the component. In some embodiments, the device includes a vibration detector and a controller coupled to the vibration detector. The controller is configured to receive electrical signals from the vibration detector, compare the electrical signals to a reference signal, determine the performance characteristic of the component based on the results of the comparison, and output a signal corresponding to the performance characteristic of the component to a user display. Based on detected signal inputs, the controller may also request maintenance from the operator or from an outside service provider, order parts automatically and/or control the components of the heat exchanger or HVAC unit to avoid component or system damage.

Advantageously, the monitoring and/or control device identifies component performance issues prior to failure of the component or unit as a whole, permitting timely maintenance to be performed and avoiding costs associated with repairs that may have been avoided and/or unplanned shutdowns.

The monitoring and/or control device includes a user interface or dashboard that permits an operator to view the performance of components of the environmental control unit at a glance, and address maintenance needs before abnormal operation and/or failure occurs.

The monitoring and/or control device is connected to the user interface via a wired or wireless connection to the cloud, whereby the user interface can be seen locally or remotely on an internet accessible electronic device.

Further advantageously, data gathered by the controller can be stored and combined with data from other similar units to perform so-called big data analyses. In one example, the data may be used to identify maintenance requirement patterns for each component of the system. In another example, the data may be used to evaluate unit design choices to allow identification and correction of weaknesses in the unit design, as well as identification of design successes and best practices.

It is understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
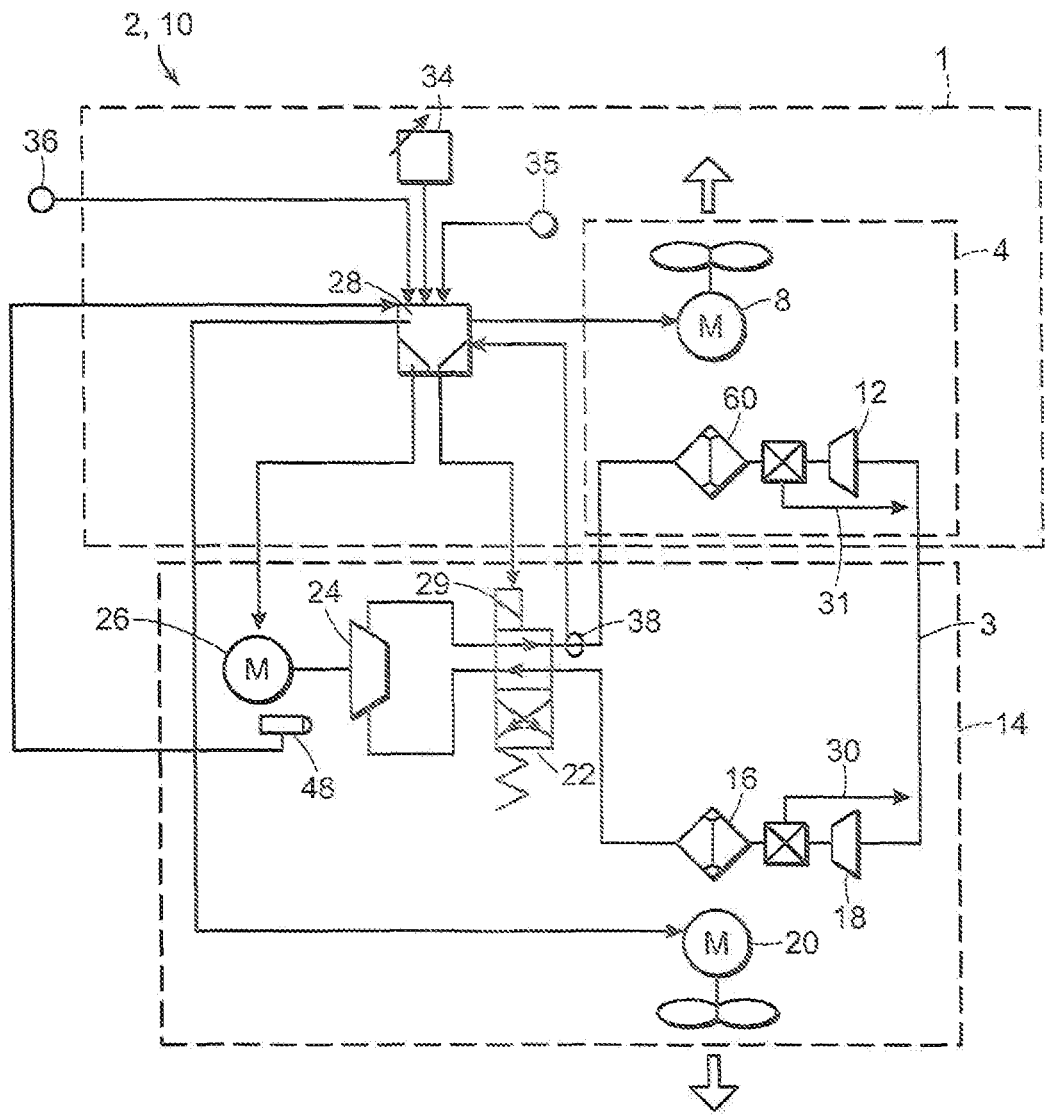
FIG. 1 is a schematic diagram of a heat pump.

Referring to FIG. 1, a monitoring device 10 is configured to monitor one or more performance characteristics of an environmental control unit as a whole and/or the individual components of the environmental control unit. The monitoring device 10 will be described herein with respect to a heat pump 2 as one example of an environmental control unit. The monitoring device 10 monitors performance characteristics of one or more of the components of the heat pump 2, such as the compressor 24, fans 8, 20 and/or heat pump electronics, as discussed further below. Moreover, in some embodiments, the monitoring device 10 can also be used to control heat pump operation based on information identified during monitoring.

The heat pump 2 is an assembly of several components, including a condensing heat exchanger 60, an evaporating heat exchanger 16, a compressor 24, and fans 8, 20 that are configured to draw air through the heat exchangers 16, 60, other ancillary components such as air filters, and a controller 28 that is configured to control operation of the heat pump 2 based on input from a user via a user input device such as a thermostat 35. Heat pumps are made in many configurations, and the following description of the heat pump 2 is exemplary in nature and non-limiting.

The heat pump 2 includes a fluid circuit that connects an indoor unit 4 and an outdoor unit 14 in a reversible cooling/heating loop 3 that permits the system 2 to be switchable between heating and cooling functions. To this end, each of the indoor unit 4 and the outdoor unit 14 includes a heat exchanger 16, 60 that may function either as an evaporator or a condenser depending on the heat pump operation mode.

For example, when heat pump 2 is operating in cooling mode, the heat exchanger 16 of the outdoor unit 14 functions as a condenser, releasing heat to the outside air, while the heat exchanger 60 of the indoor unit 4 functions as an evaporator, absorbing heat from the inside air. When heat pump 2 is operating in heating mode, the heat exchanger 16 of the outdoor unit 14 functions as an evaporator, absorbing heat from the outside air, while the heat exchanger 60 of the indoor unit 4 functions as a condenser, releasing heat to the inside air. The heat pump 2 will be described herein as though configured to perform a cooling function within the building 1.

The reversible cooling/heating loop 3 includes the indoor unit 4 including the heat exchanger 60 functioning as an evaporator, and a fan or blower 8 configured to draw or push air across the heat exchanger 60. The loop 3 also includes the outdoor unit 14. The outdoor unit includes a compressor 24, the heat exchanger 16 functioning as a condenser, and a blower 20 configured to draw or push air across an air coil unit (not shown) of the heat exchanger 16. The compressor 24 may be any suitable compressor such as a screw compressor, reciprocating compressor, rotary compressor, swing link compressor, scroll compressor, or turbine compressor. The outdoor unit 14 also includes a reversing valve 22 that is positioned in the loop 3 between the heat exchangers 16, 60 to control the direction of refrigerant flow and thereby to switch the heat pump 2 between heating mode and cooling mode. In the illustrated example, the reversing valve 22 is controlled by a controller 28 via, for example, a solenoid 29.

The loop 3 also includes an expander 12, 18, for example a thermal expansion valve (TXV), positioned immediately upstream of the evaporator inlet of each heat exchanger 16, 60. The TXVs 12, 18 are configured to decrease the pressure and temperature of the refrigerant before it enters the evaporator. The TXV valves 12, 18 may also regulate the refrigerant flow entering the evaporator so that the amount of refrigerant entering the evaporator equals, or approximately equals, the amount of refrigerant exiting the evaporator. Only one of the TXVs 12, 18 is used in a given operating mode of the heat pump 2. That is, the TXV that is used is the TXV associated with the heat exchanger 16, 60 that is currently functioning as an evaporator. For example, when heat pump 2 is operated in the cooling mode, refrigerant bypasses the TXV 18 associated with the heat exchanger 16 of the outdoor unit 14 via a first bypass line 30, and flows through the TXV 12 before entering the heat exchanger 60 of the indoor unit 4, which acts as an evaporator in the cooling mode. When heat pump 2 is operated in the heating mode, refrigerant bypasses the TXV 12 associated with the heat exchanger 60 of the indoor unit 4 via a second bypass line 31, and flows through the TXV 18 before entering the heat exchanger 16 of the outdoor unit 14, which acts as an evaporator in the heating operating mode.

In the illustrated embodiment, the fluid that passes through the loop 3 is a refrigerant, although it is not limited thereto. The refrigerant may be any fluid that absorbs and extracts heat.

During a cooling operation, the refrigerant enters the indoor unit heat exchanger 60 (e.g., the evaporator) as a low temperature and pressure liquid. Some vapor refrigerant also may be present as a result of the expansion process that occurs in the TXV 12. The refrigerant flows through the heat exchanger 60 and absorbs heat from the air, changing the refrigerant into a vapor. After exiting the evaporator, the refrigerant passes through reversing valve 22 and into the compressor 24. The compressor 24 decreases the volume of the refrigerant vapor, thereby, increasing the temperature and pressure of the vapor. After exiting from the compressor 24, the increased temperature and pressure vapor refrigerant flows into the outdoor unit heat exchanger 16 (e.g., the condenser). In the heat exchanger 16, the refrigerant vapor flows into the air coil while a blower 20 draws air across the tubes of the air coil. The heat from the refrigerant is transferred to the outside air causing the refrigerant to condense into a liquid. After exiting the outdoor unit heat exchanger 16, the liquid refrigerant flows through the TXV 12 and returns to the indoor unit heat exchanger 60 (e.g., the evaporator) as a low temperature and pressure liquid, where the cooling process begins again.

A motor 26 drives the compressor 24 and circulates refrigerant through the loop 3. The operation of the motor 26 is controlled by the controller 28. The controller 28 receives information from an input device 34, an indoor temperature sensor 35 and an outdoor temperature sensor 36, and uses the information to control the operation of heat pump 2 in both cooling mode and heating mode. In addition, the controller 28 uses information received from input device 34 to switch heat pump 2 between heating mode and cooling mode. For example, if input device 34 is set to cooling mode, the controller 28 will send a signal to the solenoid 29 to place reversing valve 22 in an air conditioning position. Consequently, the refrigerant will flow through reversible loop 3 as described above. If the input device 34 is set to heating mode, the controller 28 will send a signal to the solenoid 29 to place reversing valve 22 in a heating position. Consequently, the refrigerant will flow through the reversible loop 3 as follows: the refrigerant exits compressor 24, is condensed in the indoor unit heat exchanger 60, bypasses the TXV 12 via bypass 31, is expanded in the TXV 18, and is evaporated in the outdoor unit heat exchanger 16.

The controller 28 may execute hardware or software control algorithms to monitor and regulate heat pump 2. In some exemplary embodiments, the controller 28 may include an analog to digital (A/D) converter, a microprocessor, a non-volatile memory, and an interface board.

Figure 2:
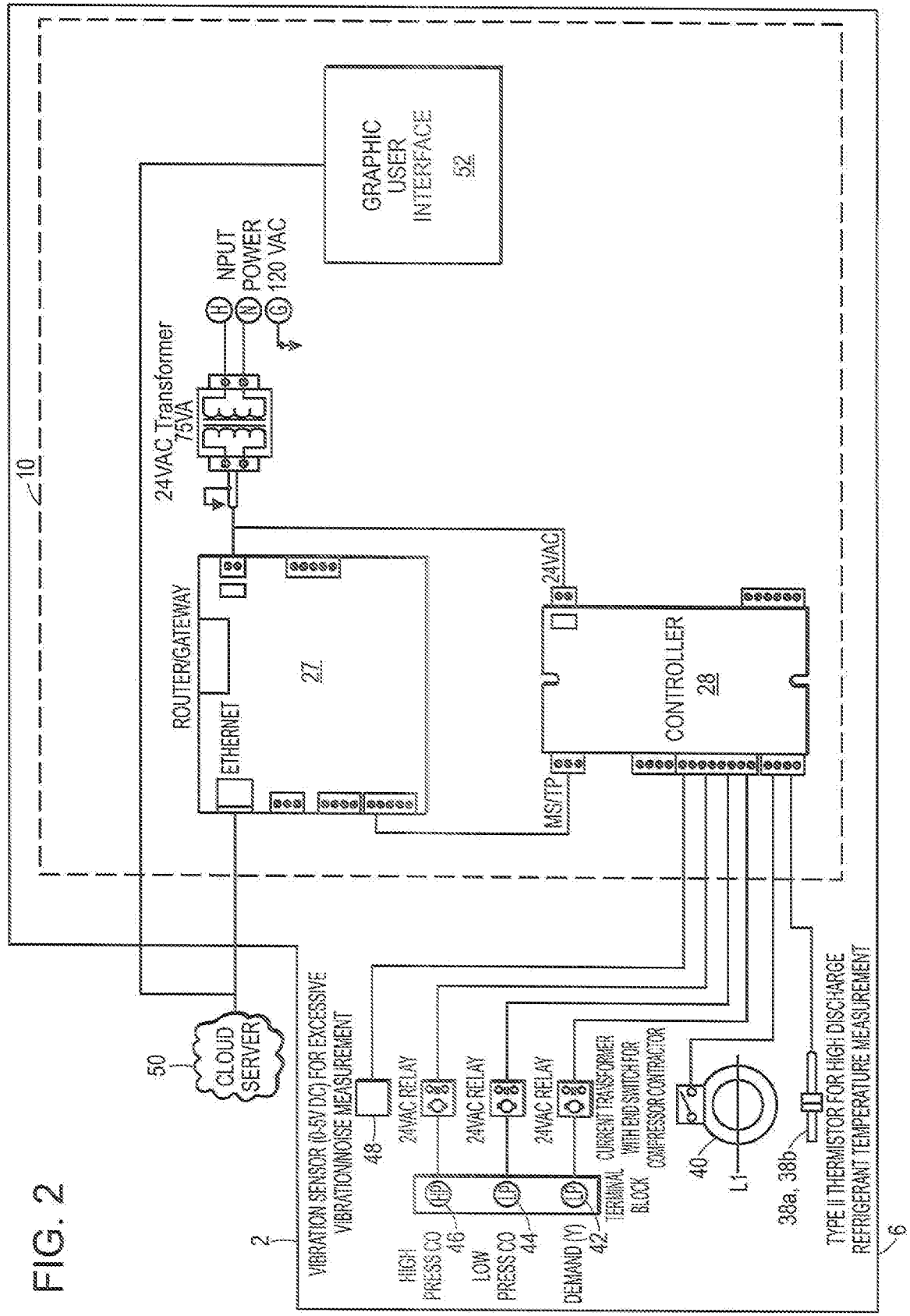
FIG. 2 is a schematic diagram of a monitoring device.

Referring to FIG. 2, the monitoring device 10 is configured to monitoring performance characteristics of one or more components of the heat pump 2, and perform various tasks depending on the detected performance characteristics. As used herein, a performance characteristic refers to a measurable or quantifiable characteristic that can be used to quantify the operating performance of the component. For example, when monitoring the compressor 24, the temperature of the refrigerant discharged from the compressor 24 can be measured using a temperature sensor 38, and a comparison of the measured temperature with a predetermined reference temperature provides an indication of whether the compressor is operating properly. Another compressor performance characteristic is the amount of vibration of the compressor 24, which can be measured using a vibration sensor 48 and compared to a reference vibration corresponding to normal compressor operation. The vibration sensor 48 may be a device that measures motion of the compressor 24 relative to the heat pump housing 6, or may be a microphone that measures acoustic vibrations emitted by the compressor 24.

The monitoring device 10 includes one or more sensors 38, 40, 48 that are configured to be situated relative to the component so as to receive and signal data from the component during operation of the component. In addition, monitoring device 10 includes the controller 28 that is coupled to the sensors. In the illustrated embodiment, the controller 28 is of the type that is not able to use transmission control protocol/internet protocol (IP), and thus the monitoring device also includes a router 27 that permits communication with the internet.

Although the monitoring device 10 is described herein with respect to monitoring the compressor 24, it is understood that other components, for example the fans 8, 20 or power and control electronics, can be monitored in addition to monitoring the compressor 24, or as an alternative to monitoring the compressor 24.

Figure 3:
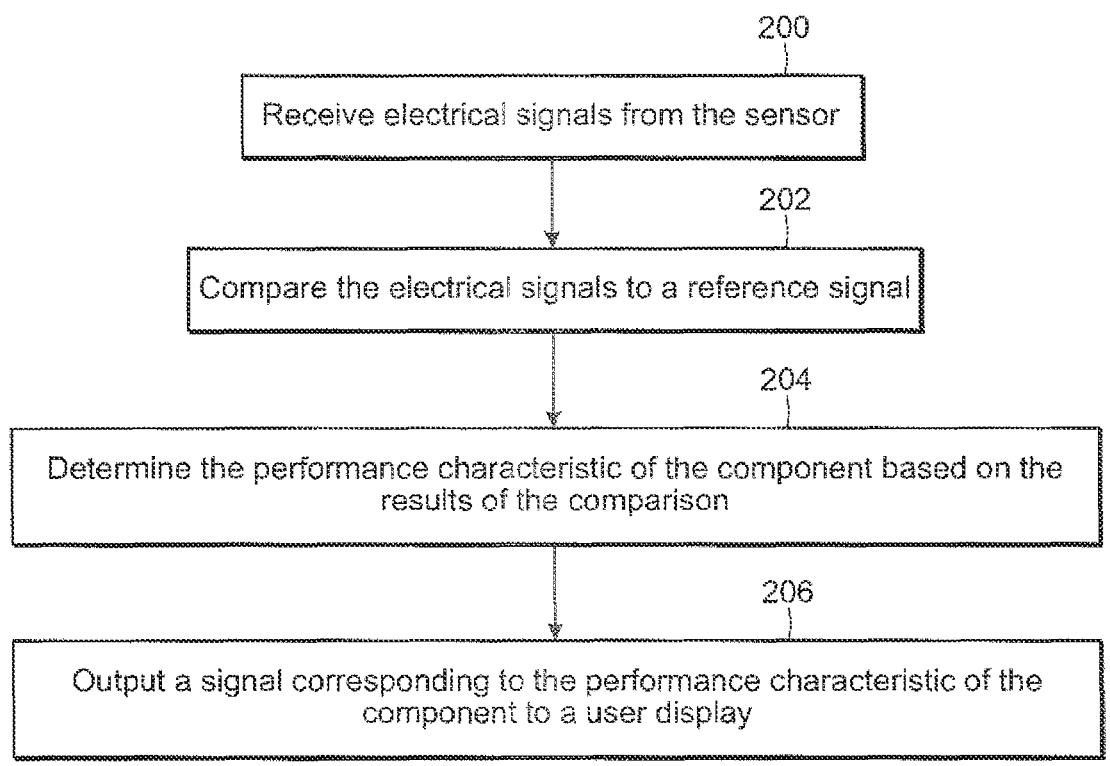
FIG. 3 is a flow diagram illustrating operation of the monitoring device.

Referring to FIG. 3, in use, the monitoring device 10 uses the controller 28 to receive electrical signals from the sensor(s) associated with the component that is being monitored, for example the compressor 24 (step 200).

After a signal from the sensor(s) has been received, the controller 28 compares the electrical signal received from the sensor(s) to a reference signal (step 202). For example, when a vibration detector 48 is used to monitor the compressor 24, the controller 28 compares the detected vibration signal to a reference vibration signal. In the illustrated embodiment, the vibration detector 48 is a microphone that detects acoustic signals emitted from the compressor 24. The received acoustic signal is compared to a reference acoustic signal or a signal range that characterizes normal operation of the compressor 24.

Based on the results of the comparison, the controller 28 determines the performance characteristic of the component (step 204). For example, if the output signal of the vibration detector 48 has a value that is greater than value of the vibration reference signal, the controller 28 determines that the compressor 24 is vibrating an abnormal amount.

Once the performance characteristic is determined, the controller 28 outputs a signal corresponding to the performance characteristic of the component to a user display (e.g., a dashboard or graphics user interface 52, step 206). When appropriate, the controller 28 updates a compressor vibration status portion of the user display 52 to indicate the value of the output signal.

The user display 52 can present a dashboard 54, which is discussed in more detail below, using a personal computer, a tablet, a smart phone or any other suitable electronics device. The performance characteristics as represented on the dashboard can be used to determine whether maintenance of the compressor 24 is required, to provide an indication or estimate of how long until maintenance will need to be performed and/or when required, to prompt the user viewing the dashboard to perform the required maintenance.

Figure 4:
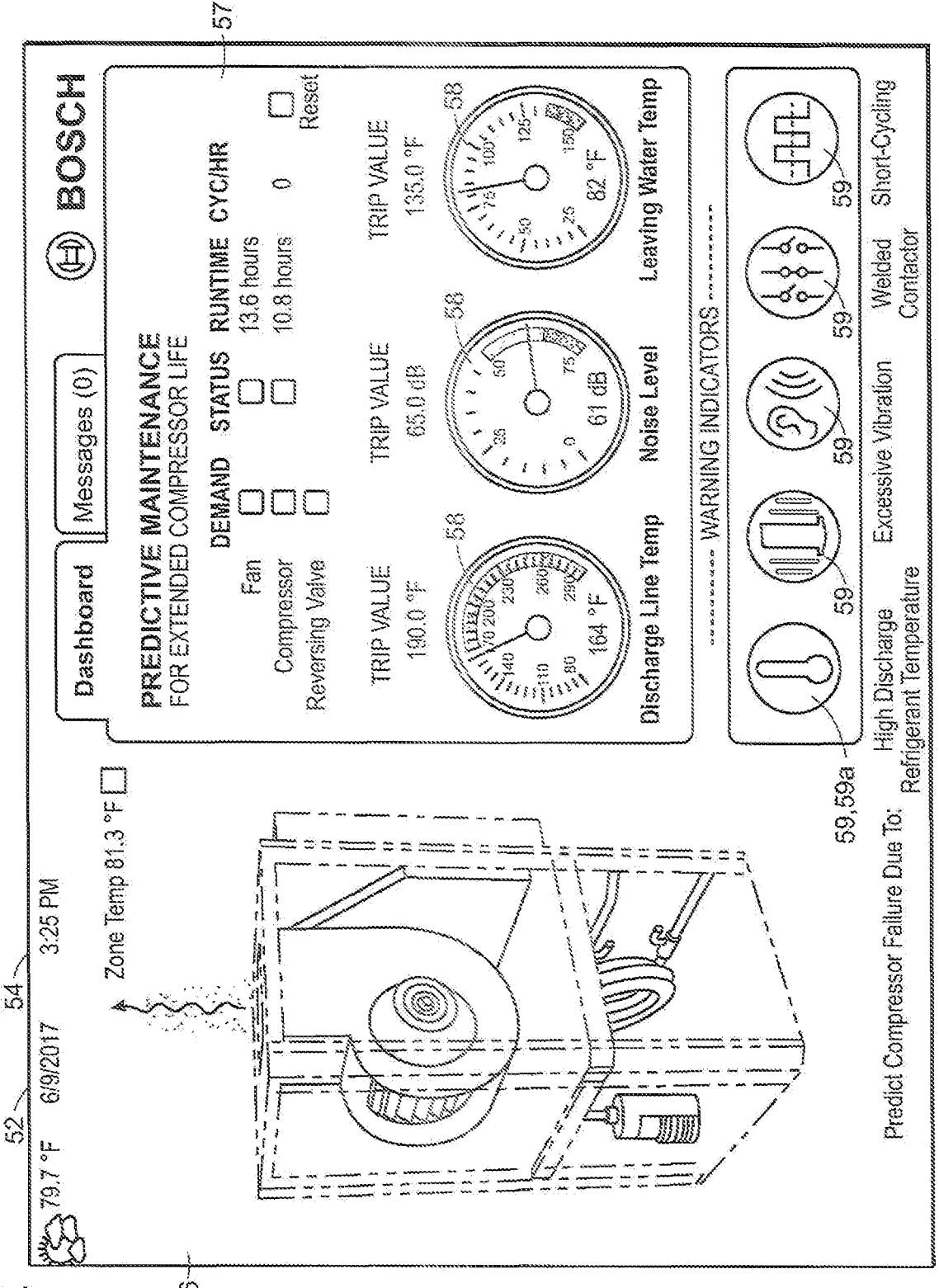
FIG. 4 is an exemplary embodiment of the dashboard of the monitoring device of FIG. 2, illustrating dashboard appearance during normal heat pump operation.
Figure 5:
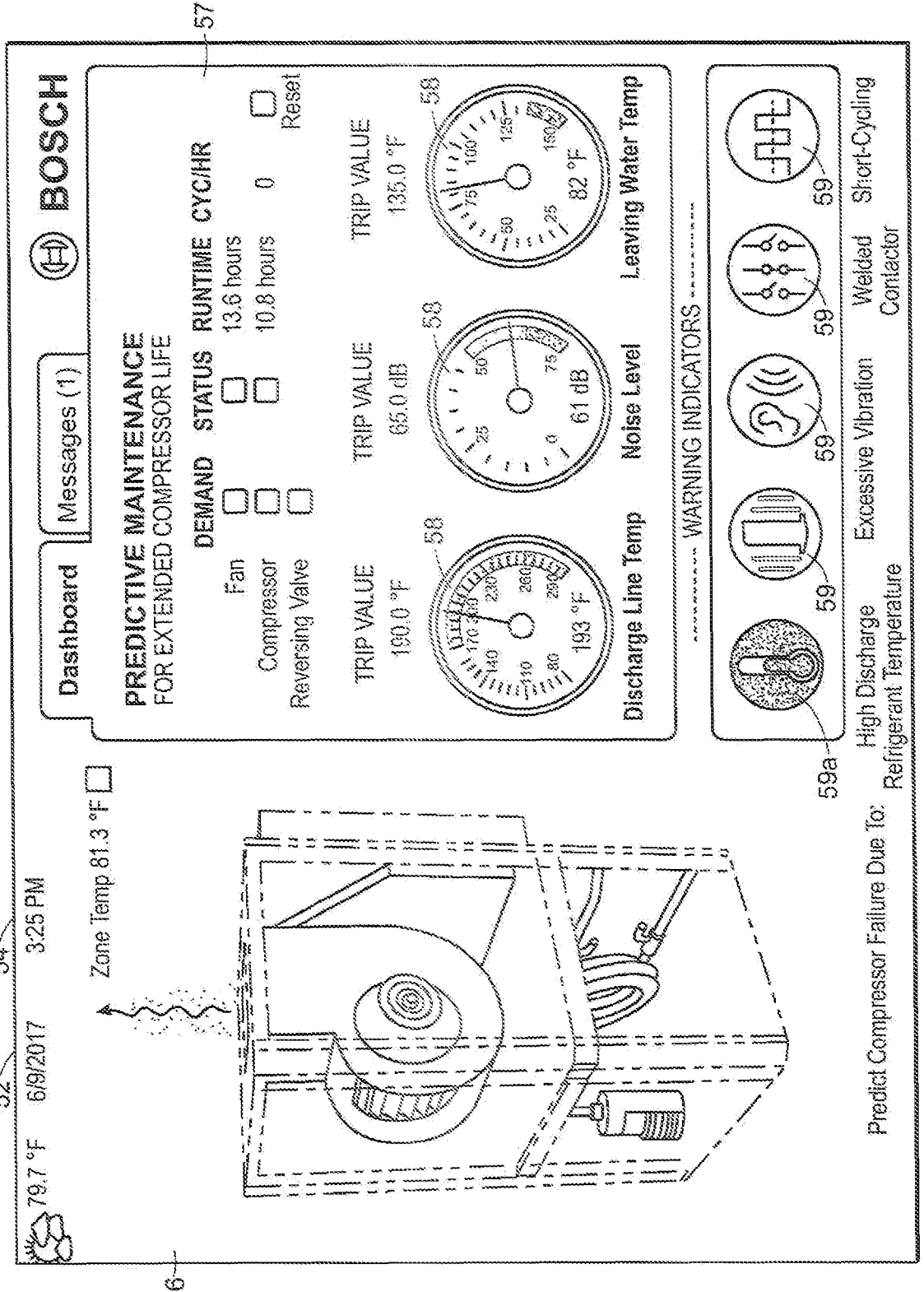
FIG. 5 is the dashboard of FIG. 3, illustrating dashboard appearance during abnormal pump operation such that a high discharge refrigerant temperature has been detected.

Referring to FIGS. 4 and 5, an image representing an exemplary dashboard 54 as presented on the user display 52 will now be described. The dashboard 54 represents a status of the monitored performance characteristics during operation of the heat pump 2. The dashboard 54 includes a left side panel 56 that corresponds to an animated perspective view of the heat pump 2 with the cabinet partially omitted to provide a view of the operating heat pump 2. The dashboard 54 includes a right side panel 57 that represents the output of monitored sensors. In the illustrated embodiment, the output of the temperature sensor 38, the output of the vibration sensor 48, and leaving water temperature are illustrated using analog dials 58. Below the analog dials 58 are several warning status elements 58 which can indicate specific performance issues when appropriate. FIG. 4 represents the dashboard appearance during normal heat pump operation. In FIG. 4, the warning status elements 58 are "greyed out" since no abnormal performance characteristics are being presented. This can be compared to FIG. 5, which represents the dashboard appearance during abnormal pump operation in which a high discharge refrigerant temperature has been detected. In FIG. 5, a warning status element 58a corresponding to the temperature sensor 38 is lit. It is understood that the representations provided in FIGS. 4 and 5 are an example of one possible dashboard configuration, and the dashboard 54 is not limited to this example.

In addition to providing maintenance prediction, the monitoring device 10 can perform one or more of the following additional functions via the controller 28. For example, an alert can be sent to a user via the dashboard 54 and/or via another communications means such as text message or e-mail. In another example, the compressor 24 and/or other appropriate component can be shut off. In the case of the compressor 24, this can be achieved for example by wherein the controller shuts off the compressor by opening a relay that permits power to be supplied to the compressor 24. As yet another example, a repair can be automatically scheduled by the controller 28 with a repair contractor and/or replacement parts can be automatically ordered.

As previously discussed, the monitoring device 10 is not limited to monitoring the vibration sensor 48. In some embodiments, a temperature sensor 38 is used to monitor the performance of the compressor 24 in addition to the vibration sensor 48. The temperature sensor 38 is disposed in the refrigerant discharge line of the compressor 24, and the controller 28 is configured to receive an output signal from the temperature sensor 38, compare the value of the temperature sensor output signal to a reference temperature value, and if the value of the temperature sensor output signal is greater than the reference temperature value, the controller outputs a signal to refrigerant discharge status portion of the dashboard 52. In some embodiments, if the value of the temperature sensor output signal is greater than the reference temperature value, the controller 28 does at least one of sending an alert to a user, shutting off the compressor, scheduling a repair with a repair contractor, and ordering replacement parts.

In some embodiments, a compressor current detector 40 is used to monitor the performance of the compressor 24 in addition to the vibration sensor 48 and/or the temperature sensor 38. In particular, the compressor current detector 40 can be used to determine whether the compressor 24 is malfunctioning by remaining in the on state continuously, as can occur due to malfunction of the contactor/relay of the compressor power circuit. In addition to receiving output from the compressor current detector 40, the controller 28 is configured to receive a change request from a user of the heat pump 2. The request can be detected by the controller 28 via a thermostat current sensor 42 which monitors the thermostat. The controller 28 compares the output signal of the compressor current detector 40 to a reference current signal, and if the value of the compressor current detector output signal is greater than the value of the reference current signal, the controller 28 verifies that a change request has been received by checking the thermostat current sensor 42. If no change request has been received, the controller outputs a signal to a welded connector status portion of the dashboard, indicating a possible welded connector. In some embodiments, the controller 28 also does at least one of sending an alert to a user, shutting off the compressor, scheduling a repair with a repair contractor, and ordering replacement parts.

Figure 6:
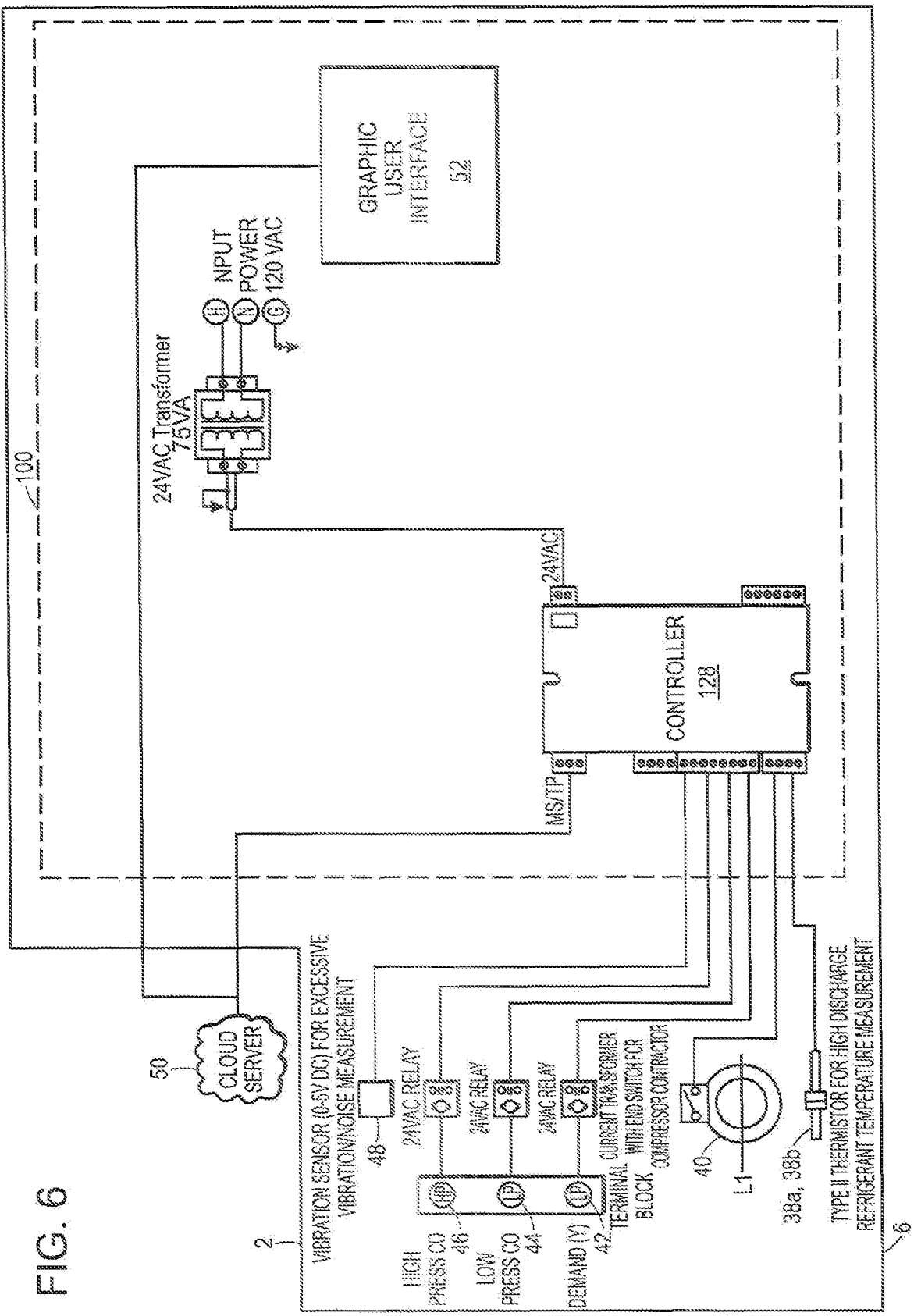
FIG. 6 is a schematic diagram of an alternative embodiment monitoring device.

Referring to FIG. 6, although the controller 28 illustrated in FIG. 2 is of the type that does have IP capabilities, the monitoring device 10 is not limited to this type of controller.

For example, in some embodiments, the controller 128 is IP enabled, and thus the router 27 can be omitted.

The heat pump 1 including a monitoring and/or control device has been described herein in some detail as an example of how the monitoring and/or control device can be incorporated into an environmental control unit. It is understood that the monitoring and/or control device can be incorporated into other types of heat pumps, as well as other types of environmental control units, including, but not limited to, cooling units and/or air handling units.

Selective illustrative embodiments of the heat pump and monitoring and/or controlling device are described above in some detail. It should be understood that only structures considered necessary for clarifying the heat pump and monitoring and/or controlling device have been described herein. Other conventional structures, and those of ancillary and auxiliary components of the heat pump and monitoring and/or controlling device, are assumed to be known and understood by those skilled in the art. Moreover, while a working example of the heat pump and monitoring and/or controlling device have been described above, the system, the heat pump and monitoring and/or controlling device are not limited to the working examples described above, but various design alterations may be carried out without departing from the heat pump and monitoring and/or controlling device as set forth in the claims.

What is claimed is:

1. A monitoring and/or control device for monitoring a component of an environmental control unit, the device including a sensor configured to be situated relative to the component so as to receive and signal data from the component during operation of the component, and a controller coupled to the sensor, the controller configured to (i) receive electrical signals from the sensor, (ii) compare the electrical signals to a reference signal, (iii) determine a performance characteristic of the component based on the results of the comparison, and (iv) output a signal corresponding to the performance characteristic of the component to a user display.

2. The device of claim 1, wherein the sensor is a vibration sensor and the component is a compressor.

3. The device of claim 2, wherein the vibrations are acoustic vibrations.

4. The device of claim 1, wherein the sensor is a vibration sensor and the component is a fan.

5. The device of claim 1, wherein the controller is configured do at least one of sending an alert to a user, shutting off the compressor, scheduling a repair with a repair contractor, and ordering replacement parts.

6. The device of claim 3, wherein the at least one vibration detector comprises at least one microphone.

7. The device of claim 4, wherein the vibrations are acoustic vibrations.

8. The device of claim 7, wherein the at least one vibration detector comprises at least one microphone.

* * * * *